US010030373B1

(12) United States Patent
Batista

(10) Patent No.: US 10,030,373 B1
(45) Date of Patent: Jul. 24, 2018

(54) APPARATUS AND METHOD TO REDUCE MAGNETIC DEBRIS ENTRAINED IN WASTE WATER

(71) Applicant: Carlos M. Batista, Huntington Station, NY (US)

(72) Inventor: Carlos M. Batista, Huntington Station, NY (US)

( * ) Notice: Subject to any disclaimer, the term of this patent is extended or adjusted under 35 U.S.C. 154(b) by 0 days.

(21) Appl. No.: 15/077,487

(22) Filed: Mar. 22, 2016

Related U.S. Application Data

(60) Provisional application No. 62/139,126, filed on Mar. 27, 2015.

(51) Int. Cl.
*E03C 1/26* (2006.01)
*E03C 1/262* (2006.01)
*C02F 1/48* (2006.01)

(52) U.S. Cl.
CPC .............. *E03C 1/262* (2013.01); *C02F 1/481* (2013.01)

(58) Field of Classification Search
CPC .................................. E03C 1/262; C02F 1/481
USPC .............................................................. 4/287
See application file for complete search history.

(56) References Cited

U.S. PATENT DOCUMENTS

| 2,617,997 | A | * | 11/1952 | Hiertz | E03C 1/262 4/287 |
| 2,736,577 | A | * | 2/1956 | MacKey | E03C 1/262 285/139.3 |
| 3,834,539 | A | * | 9/1974 | Thompson | B01D 35/02 210/167.32 |
| 4,692,948 | A | * | 9/1987 | Martin | E03C 1/262 206/818 |
| 5,208,921 | A | * | 5/1993 | Nicoll | E03C 1/23 4/286 |
| 7,900,289 | B2 | * | 3/2011 | Landsberger | E03C 1/264 210/222 |
| 2016/0201307 | A1 | * | 7/2016 | Franzen | E03C 1/2302 4/295 |

OTHER PUBLICATIONS

Magnetic Sink Strainers, 3 Pack; P212121; 1 page; http://store.p212121.com/magnetic-sink-strainers/.
Rare Earth Magnets; 10 Piece; distributed by Harbor Freight Tools; Camarillo, CA; 1 page.

* cited by examiner

*Primary Examiner* — Christine Skubinna
(74) *Attorney, Agent, or Firm* — Alfred M. Walker

(57) ABSTRACT

An environmentally sound magnetic sink strainer with a magnetic post fits inside a kitchen sink drain opening flush below the surface of the bottom floor of the sink. In this sunken position, the bottom floor of the sink is horizontally flat, enabling a person to clean pots and pans positioned on the flat sink floor. The central operating magnetic post is attachable to a rubber stopper at the bottom of the sink strainer. As waste water with entrained magnetic steel wool debris passes into the strainer, the magnetic central operating post attracts and collects the debris, capturing it and preventing it's progression into the sink drain and trap. The magnetic post can be conveniently wiped by a paper towel or rag to dispose the metal steel wool debris collected as solid waste.

23 Claims, 2 Drawing Sheets

US 10,030,373 B1

APPARATUS AND METHOD TO REDUCE MAGNETIC DEBRIS ENTRAINED IN WASTE WATER

RELATED APPLICATIONS

This application claims priority under 35 USC § 119(e) from provisional patent application Ser. No. 62/139,126, filed Mar. 27, 2015. The '126 application is incorporated by reference herein.

FIELD OF THE INVENTION

The present invention relates to magnetic posts for collecting metal debris from steel wool scrubbing pads used in cleaning dishes in a kitchen sink.

BACKGROUND OF THE INVENTION

In commercial and residential kitchens, steel wool is used in large quantities to clean utensils and pots and pans from caked-on food remnants. Magnetic debris from the steel wool pads and scrubbing cloths breaks off in the process. This debris gets entrained in the soapy and greasy waste water and goes down the drain causing clogs and build-up to accumulate rapidly in the sink trap and drain pipes. This necessitates frequent attention to keep the drains functional. By capturing the magnetic debris before it goes down the drain, it can be collected and discarded by wiping with a paper towel or rag and disposed separately thereby greatly extending the interval between preventive maintenance to drains and sink traps. A sink strainer designed to perform this function is the subject of the present invention.

The prior art reveals a patent for a vertically extending magnetic sink strainer of Landsberger et al. (U.S. Pat. No. 7,900,289) which is designed to help retrieve magnetic stirring bars from laboratory sinks after a cleaning process. The stirring bars and associated lab equipment are well described in the patent of Yaniv et al. (U.S. Pat. No. 7,748,893) of which Landsberger is a co-inventor. The prior art magnetic sink strainer is best illustrated in FIG. 2 of Landsberger '289 showing it in place over a sink drain and magnetically attracting stirring bars 206. It consists of an elastomeric strainer engaged by legs at the edge of the sink drain. It has an upward rising central hollow cylinder with a flat top centered atop the drain opening; this cylinder has a flat base at the sink bottom level. Both the base and cylinder sides have slits with openings sized to exclude stirring bars or similar objects while permitting waste water flow. The inside of the cylindrical portion has attached one or more cylindrical magnets; these attract the stirring bars or other magnetic items to collect them in the drain area for easy manual pick-up. Clearly, this magnetic sink strainer cannot be used in a commercial kitchen sink as the cylindrical section protruding upward from the drain would preclude the cleaning of pots and pans which require a flat sink bottom surface on which to exert force during vigorous scrubbing.

SUMMARY OF THE INVENTION

The magnetic sink strainer used in this invention is visually indistinguishable from an ordinary strainer which fits inside the central drain opening. The central operating post attached to the rubber stopper at the bottom is magnetic however. The stopper is used for alternately opening or closing the central drain opening. As waste water with entrained magnetic steel wool debris passes into the strainer, the magnetic central operating post attracts and collects the debris capturing it and preventing it's progression into the sink drain and trap. This can be conveniently wiped by a paper towel or rag to dispose the debris as solid waste.

In the first embodiment, the operating post itself constitutes a permanent magnet. One magnetic material that can be used for this magnet is Alnico 5. While this material is too brittle to be machinable, it can be cast to net shape, magnetized, and then plated or powder-coated in epoxy for corrosion protection. A machinable permanent magnetic alloy such as FeCrCo can be used instead; the shape with a grasping knob on top and rubber stopper engaging barbs at the distal end is then easily machined on a lathe.

In the second embodiment, the central operating post is hollow and a powerful neodymium (NdFeB) rod magnet is sealed within. The central operating post need not be ferromagnetic as long as it encapsulates the rod magnet.

In a third embodiment, the central operating post is again hollow and two or more neodymium disk magnets are sealed within.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
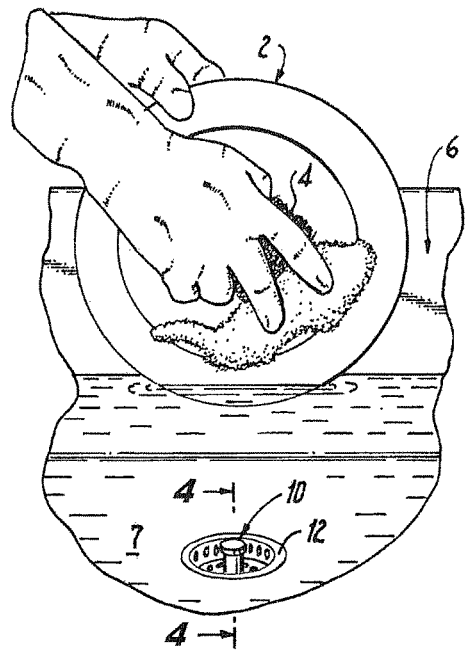
FIG. 1 is a perspective view of a dish washing operation using a steel wool pad.

FIG. 1 shows a hand washing operation with a prior art plate 2 being scrubbed by a conventional steel wool pad 4 inside a conventional sink 6, but with the inventive magnetic post 10 of the present invention shown provided and inserted inside prior art perforated strainer 12.

Figure 2:
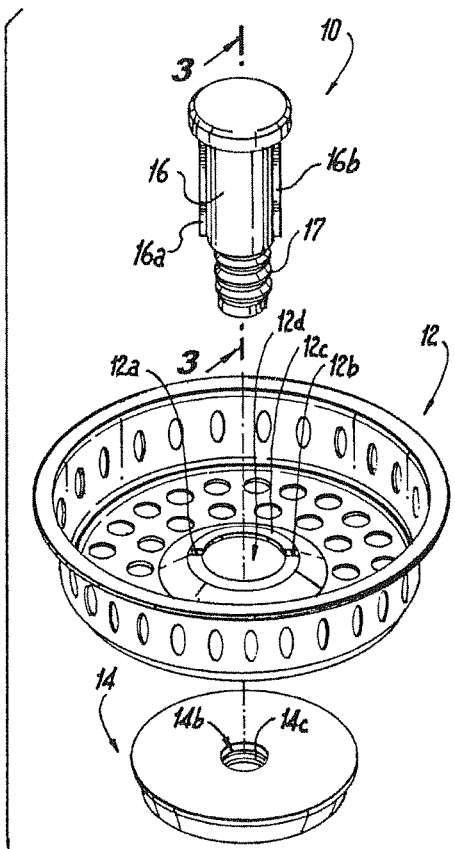
FIG. 2 is an exploded perspective view of the first embodiment of the magnetic post sink strainer.

FIG. 2 is an exploded view of the first embodiment 10 of the magnetic strainer post of the present invention, shown using the aforementioned conventional perforated strainer 12, wherein magnetic post 10 is shown provided with upper cylindrical portion 16, which is shaped as the upper top portion of the operating magnetic post 10, integrally connected above and to a lower barbed portion 17 of magnetic post 10.

FIG. 2 also shows prior art rubber stopper disk 14, which is positioned below perforated strainer 12. Magnetic post 10 has barbed lower portion 17 at its distal end, engageable with conventional ribbed inside surface 14a of central hole 14b, to engage and removably connect magnetic post 10 to conventional rubber stopper 14 below perforated strainer 12. Conventional rubber stopper 14 is used for alternately opening or closing the central drain opening. Magnetic post 10 is seated in place within strainer 12 by insertion of opposite exterior wings 16a, 16b of magnetic post 10, which are inserted in positional register with corresponding opposite slits 12a, 12b located opposite each other on a peripheral edge 12c of central hole 12d of perforated strainer 12. Perforated strainer 12 also has a top peripheral circumferential shoulder 12e resting flush on the bottom floor 7 of sink 6, as also shown in FIG. 4 herein.

Figure 3:
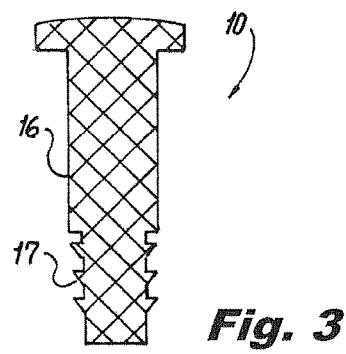
FIG. 3 is a side crossection of the magnet used as an operating magnetic post.

FIG. 3 shows a crossection of shaped magnetic post 10 having upper portion 16 and lower barbed portion 17.

Figure 4:
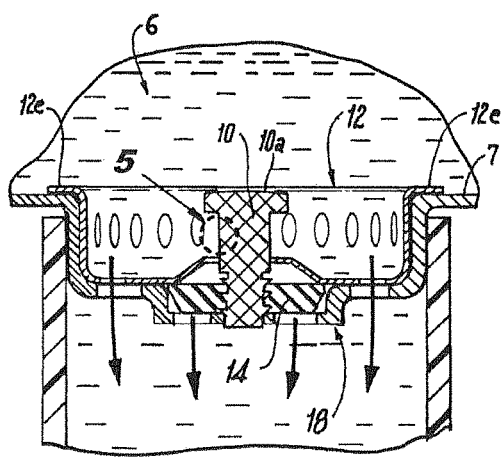
FIG. 4 is a side crossection of the magnetic post strainer of the first embodiment.

FIG. 4 is a side view crossection showing the various parts of FIG. 2 as fit within sink drain 18 of sink 6. Unlike the prior art upwardly extending magnetic dome of Landsberger '289, which interferes with washing flat bottomed pots and pans, it is noted that the top 10a of magnetic post 10 is flush with bottom floor 7 of sink 6, to provide an operative flat surface for washing pots and pans in sink 6.

Figure 5:
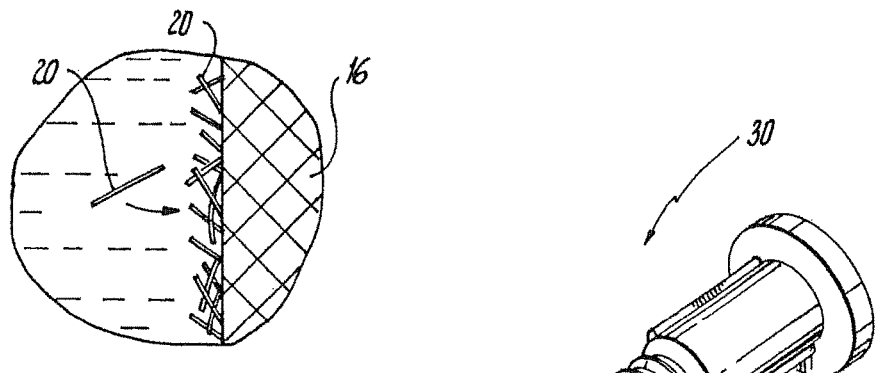
FIG. 5 is a side detail showing steel wool debris being attracted and attached to the magnet operating post.

FIG. 5 is a close-up detail at the side of the magnetic post 10's magnetic upper potion 16, showing steel wool debris 20 being attracted in the direction of the arrow shown thereto, and thereby attached by magnetic attraction to the side of the magnetic upper portion 16 of magnetic post 10.

It is noted that FIG. 5 is also an accurate illustration of the collection of steel wool debris regardless of the embodiment of magnetic strainer of this invention.

Figure 6:
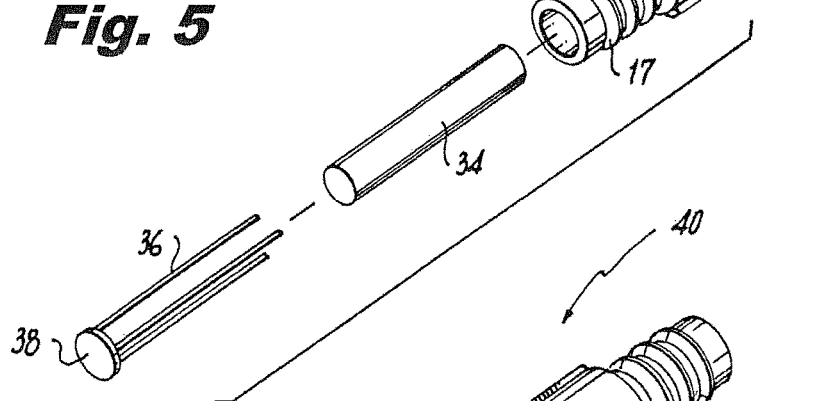
FIG. 6 is an exploded perspective view of the second embodiment of the magnetic post strainer of this invention using a rod magnet encapsulated within a blind hole in the distal end of the operating magnetic post.

FIG. 6 shows an exploded view of the second embodiment of operating magnetic post 30 which has a blind hole through the distal end adjacent to barbs 17. Powerful neodymium rod magnet 34 is inserted, centered by wires 36, and sealed by press fit end cap 38. Magnet 34 is thereby encapsulated and corrosion protected in magnetic post 30.

Figure 7:
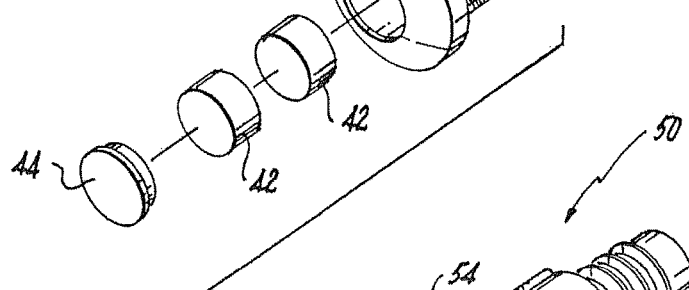
FIG. 7 is an exploded perspective view of the third embodiment of the magnetic post strainer of this invention using two powerful disk magnets encapsulated within a blind hole in the top of the operating magnetic post.

FIG. 7 shows an exploded view of the third embodiment of operating magnetic post 40 which has a blind hole through the grasping knob at the top. Two disk neodymium magnets 42 are shown being inserted and sealed by press fit cap 44. More than two disk magnets can be used as desired.

Figure 8:
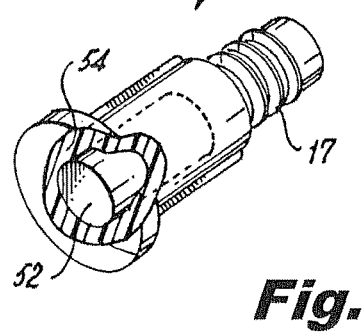
FIG. 8 is an assembled perspective view in partial crossection of another embodiment for a sealed operating magnetic post.

FIG. 8 shows an assembled view of a sealed operating magnetic post 50, having a distal end with barbs 17 engageable with rubber stopper disk 14 of FIG. 2. The magnet rod 52 is inserted within hollow magnetic post 50 and sealed by sealing material 54. Note that this embodiment concentrates the magnetic attraction of steel wool debris near the top end where it is easier to wipe off and discard.

It is further noted that while FIG. 6 shows magnet rod 34 being inserted through a hole in the lower distal end near barbs 17, and that FIGS. 7 and 8 show the magnet disks 42 or the magnet rod 52 being inserted at the proximal top end of the magnetic posts, magnet rod 34 could be inserted at the top proximal end of magnetic post 30, and magnet disks 42 of FIG. 7 and magnet rod 52 of FIG. 8 could likewise alternatively be inserted through the lower distal end near barbs 17, depending upon the width of the magnet disks 42 or magnet rod 52 and a hole (not shown) at the lower distal end of magnetic posts 40 and 50.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing from the scope of the invention. as noted in the appended Claims.

I claim:

1. A method of retaining debris of ferromagnetic material and preventing the debris from contaminating a sink drain of a sink with a horizontally flat sink lower bottom floor having a central drain opening, said central drain opening formed by a downwardly extending annular wall and a lower bottom floor; said method consisting essentially of the steps of:

providing a sink strainer sized to fit in said central drain opening of the sink to allow waste water to pass through while retaining debris of ferromagnetic material, said strainer having an annular descending wall adapted to be flush against an inner surface of said downwardly extending annular wall of said sink, and a perforated bottom strainer floor with a central raised platform surrounded by a lower annular horizontal portion resting on a horizontal portion of said sink surrounding said central drain opening;

providing a stopper disk mounted below said platform in said central drain opening of said horizontally flat sink bottom floor for alternately opening or closing said central drain opening;

inserting the strainer in said drain opening, the strainer having an upper annular shoulder supporting said strainer within said drain opening;

resting said annular shoulder of the strainer on said horizontally flat lower bottom floor of the sink, said lower bottom floor of said sink having an opening surrounding said mounted stopper disk for allowing downward flow of said waste water into said drain;

inserting a longitudinally extending post comprising a magnet extending vertically through said platform of said perforated bottom strainer floor attached to said stopper disk for collecting magnetic debris from steel wool in said waste water, said post and stopper disk being removably fixed in said strainer below said platform, and said post being free standing above said platform for collecting said debris over a complete circumference thereof;

said post having wings extending from an outer surface thereof and engaging said wings in respective engaging slots in said bottom strainer floor;

providing said magnetic post with an upper grasping knob comprising a flange at an upper end thereof, said flange having a flat top surface;

inserting said magnetic post in said strainer so that said flat top surface of said flange of said magnetic post maintains with said strainer annular shoulder an operative flat surface for washing pots and pans in said sink;

placing and stabilizing an unclean pot or dish with a flat bottom for manual scrubbing upon said horizontally flat sink bottom floor; and wiping an outer surface of said magnetic post in said strainer above said platform with a paper towel or rag for collecting and disposing of said magnetic debris from steel wool scrubbing pads used in cleaning dishes and pots and pans thereby greatly extending an interval between preventive maintenance to drains and sink traps.

2. The method of claim 1 wherein said post is made of a magnetic material, said magnetic post extending above said platform allowing said outer surface of said magnetic post to be wiped clean of magnetic debris without removal of said strainer from said sink opening.

3. The method of claim 1 wherein said post comprises a hollow shell containing a rod shaped magnet, said post having a bottom opening with an end cap for insertion and removal of said rod shaped magnet for concentrating magnetic attraction along said upper portion for ease of removing magnetic debris collected on an outside surface of said post, said end cap having wires extending therefrom into said bottom opening for centering said rod shaped magnet.

4. The method of claim 1 wherein said post comprises a hollow shell containing one or more disk shaped magnets, said grasping knob having a blind hole for insertion of said disk shaped magnets therein.

5. In combination, a magnetic sink strainer sized to fit in a drain opening of a sink to allow waste water to pass through while retaining debris of ferromagnetic material consisting essentially of:
    said sink having a horizontally flat sink bottom floor with a drain opening surrounded by a horizontal shoulder;
    said horizontally flat sink bottom floor providing a stabilizing floor for stabilizing an unclean pot or dish with a flat bottom for manual scrubbing said unclean pot or dish upon said horizontally flat sink bottom floor;
    a removable strainer with a perforated bottom in said drain opening, said strainer having an annular shoulder supporting said strainer within said drain opening; and
    a longitudinally extending post comprising a magnet extending vertically upwardly through a central raised platform of said strainer bottom and removably attached to a stopper disk fixed at a bottom end thereof under said central raised platform, said magnetic post having an outer circumference above said central raised platform for collecting magnetic debris from steel wool in said waste water, said post positioned in said strainer to have said outer circumference reachable by a paper towel or rag for collecting and disposing of said magnetic debris while said strainer is in said sink.

6. The combination of claim 5 in which said post has a grasping knob comprising a flange at an upper end thereof, a top surface of said flange not extending above said annular shoulder of said strainer to maintain an operative flat surface for washing pots and pans in said sink.

7. The combination of claim 6 in which a lower portion of said post is barbed for engaging said stopper disk.

8. The combination of claim 7 in which said post has wings extending from an outer surface thereof engaging slots in said bottom strainer floor.

9. The combination of claim 8 in which said post comprises a hollow shell containing a rod shaped magnet, said post having a bottom opening with an end cap for insertion and removal of said rod shaped magnet, said end cap having wires extending therefrom into said bottom opening for centering said rod shaped magnet.

10. The combination of claim 9 in which said rod shaped magnet is made of neodymium.

11. The combination of claim 8 in which said post comprises a hollow shell containing disk shaped magnets, said grasping knob having a blind hole for insertion of said disk shaped magnets.

12. The combination of claim 8 in which said magnetic post comprises a hollow upper portion containing a magnetic rod for concentrating magnetic attraction along said upper portion for ease of removing magnetic debris collected on an outside surface of said post.

13. In combination, a magnetic sink strainer sized to fit in a drain opening of a sink to allow waste water to pass through while retaining debris of ferromagnetic material consisting essentially of:
    said sink with a horizontally flat sink bottom floor having a drain opening, said drain opening formed by a downwardly extending annular wall and a lower horizontal bottom floor;
    said lower bottom floor having a central opening; a stopper disk mounted in said central opening;
    a strainer in said drain opening, said strainer having an annular shoulder supporting said strainer within said drain opening, an annular descending wall, and a perforated bottom strainer floor with a central raised platform resting on said horizontally flat lower bottom floor of said sink, said horizontally flat lower bottom floor of said sink having an opening surrounding said stopper disk for allowing downward flow of said waste water into said drain;
    said horizontally flat sink bottom floor providing a stabilizing floor for stabilizing an unclean pot or dish with a flat bottom for manual scrubbing said unclean pot or dish upon said horizontally flat sink bottom floor; and
    a longitudinally extending post comprising a magnet extending vertically upwardly through said raised platform of said bottom strainer floor attached to said stopper disk at a bottom thereof under said raised platform for collecting magnetic debris from steel wool in said waste water on an outer surface of said post above said raised platform whereby said outer surface is reachable by a paper towel or rag for collecting and disposing of said magnetic debris while said strainer is in said sink.

14. The combination of claim 13 in which said post has a grasping knob comprising a flange with a flat top surface at an upper end thereof, a top surface of said flange not extending above said annular shoulder of said strainer to maintain an operative flat surface for washing pots and pans in said sink.

15. The combination of claim 14 in which a lower portion of said post is barbed for engaging said stopper disk.

16. The combination of claim 15 in which said post has wings extending from an outer surface thereof engaging slots in said bottom strainer floor.

17. The combination of claim 16 in which said post comprises a hollow shell containing a rod shaped magnet, said post having a bottom opening with an end cap for insertion and removal of said rod shaped magnet, said end cap having wires extending therefrom into said bottom opening for centering said rod shaped magnet.

18. The combination of claim 17 in which said rod shaped magnet is made of neodymium.

19. The combination of claim 16 in which said magnetic post comprises a hollow shell containing disk shaped magnets, said grasping knob having a blind hole for insertion and removal of said disk shaped magnets.

20. The combination of claim 16 in which said post comprises a hollow upper portion containing a magnetic rod for concentrating magnetic attraction along said upper portion for ease of removing magnetic debris collected on an outside surface of said post.

21. The method of claim 1 further including the step of removing said post from said stopper disk and said strainer, and wiping said outer surface of said magnetic post removed from said stopper disk and said strainer.

22. The combination of claim 5 wherein said magnet post is removable from said strainer and said stopper disk, and said outer circumference of said magnet post further being reachable by a paper towel or rag for collecting and disposing of said magnetic debris, after said magnet post is removed from said strainer and said stopper disk.

23. The combination of claim 13 wherein said post with a magnet is removable from said strainer and said stopper disk, said outer surface of said post with said magnet further being reachable by a paper towel or rag for collecting and disposing of said magnetic debris, after said post with a magnet is removed from said strainer and said stopper disk.

\* \* \* \* \*